(12) United States Patent
Howell

(10) Patent No.: US 6,996,904 B1
(45) Date of Patent: Feb. 14, 2006

(54) METHOD FOR MANAGING CABLES

(75) Inventor: Matthew G. Howell, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 08/987,005

(22) Filed: Dec. 8, 1997

(51) Int. Cl.
*H01R 43/28* (2006.01)

(52) U.S. Cl. ............................. 29/868; 29/857; 29/33 F; 29/755; 174/101; 439/719; 439/445

(58) Field of Classification Search ................ 29/33 F, 29/825, 564.2, 755, 782, 760, 761, 857, 868; 174/48, 49, 72 A, 101; 52/220.7; 439/719, 439/445
See application file for complete search history.

(56) References Cited

U.S. PATENT DOCUMENTS

| | | | |
|---|---|---|---|
| 334,763 A | * | 1/1886 | Fay |
| 1,857,378 A | * | 5/1932 | Hubbell, Jr. |
| 2,161,492 A | | 6/1939 | Wadsworth |
| 3,338,599 A | | 8/1967 | Hallman |
| 3,403,220 A | * | 9/1968 | Riedel et al. .......... 174/72 A X |
| 3,461,220 A | * | 8/1969 | Hukin .......................... 174/48 |
| 3,541,244 A | | 11/1970 | Joly |
| 3,622,686 A | * | 11/1971 | Neirnck et al. .............. 174/497 |
| 3,626,086 A | | 12/1971 | Rubey |
| 3,701,836 A | * | 10/1972 | Ward et al. ..................... 174/48 |
| 3,705,949 A | | 12/1972 | Weiss |
| 3,890,459 A | | 6/1975 | Caveney |
| 4,136,257 A | | 1/1979 | Taylor |
| 4,406,379 A | * | 9/1983 | Anderson et al. ........... 220/335 |
| 4,534,147 A | * | 8/1985 | Cristell ......................... 52/287 |
| 4,713,007 A | | 12/1987 | Alban |
| 4,715,010 A | | 12/1987 | Inoue et al. |
| 4,774,697 A | | 9/1988 | Aihara |
| 4,872,005 A | | 10/1989 | DeLuca et al. |
| 5,008,491 A | * | 4/1991 | Bowman ...................... 174/48 |
| 5,023,404 A | | 6/1991 | Hudson et al. |
| 5,043,721 A | | 8/1991 | May |
| 5,076,584 A | | 12/1991 | Openiano |
| 5,086,195 A | | 2/1992 | Claisse |
| 5,118,069 A | | 6/1992 | Muhlethaler |
| 5,125,843 A | | 6/1992 | Holloway |
| 5,128,981 A | | 7/1992 | Tsukamoto et al. |
| 5,139,261 A | | 8/1992 | Openiano |
| 5,148,152 A | | 9/1992 | Stueckle et al. |
| 5,177,473 A | | 1/1993 | Drysdale |
| D333,324 S | | 2/1993 | Michael |
| D339,612 S | | 9/1993 | Carter et al. |
| 5,274,972 A | * | 1/1994 | Hansen ...................... 52/220.5 |
| 5,316,244 A | | 5/1994 | Zetena et al. |

(Continued)

FOREIGN PATENT DOCUMENTS

JP  9-237530  *  9/1997

OTHER PUBLICATIONS www.siemon.com/products/newproducts/nmultiaccesscm. html, Aug. 1997.*

(Continued)

*Primary Examiner*—A. Dexter Tugbang
(74) *Attorney, Agent, or Firm*—Trop, Pruner & Hu, P.C.

(57) ABSTRACT

A method is to be used with a device that is capable of carrying a cable and has a cover with a port. The method includes: (1) arranging the cable in the tray; (2) determining that the port is to be used to connect the cable; and (3) connecting the cable to the port.

11 Claims, 5 Drawing Sheets

U.S. PATENT DOCUMENTS

| | | | |
|---|---|---|---|
| 5,317,699 A | 5/1994 | Sugita et al. | |
| 5,334,997 A | 8/1994 | Scallon | |
| 5,362,923 A * | 11/1994 | Newhouse et al. | 174/48 |
| 5,396,267 A | 3/1995 | Bouton | |
| 5,431,569 A | 7/1995 | Simpkins et al. | |
| D362,278 S | 9/1995 | Hayes | |
| 5,451,714 A | 9/1995 | Duffie | |
| 5,497,141 A | 3/1996 | Coles et al. | |
| 5,499,020 A | 3/1996 | Motohashi et al. | |
| D368,496 S | 4/1996 | Seger | |
| 5,528,667 A | 6/1996 | Steffensen et al. | |
| 5,548,506 A | 8/1996 | Srinivasan | |
| 5,548,932 A | 8/1996 | Mead | |
| 5,552,807 A | 9/1996 | Hayes et al. | |
| 5,597,980 A * | 1/1997 | Weber | 174/72 A |
| 5,616,078 A | 4/1997 | Oh | |
| 5,623,242 A | 4/1997 | Dawson, Jr. et al. | |
| 5,709,249 A | 1/1998 | Okada et al. | |
| 5,728,976 A | 3/1998 | Santucci et al. | |
| 5,732,747 A * | 3/1998 | Holliday | 138/163 |
| 5,831,211 A * | 11/1998 | Gartung et al. | 174/48 |
| 5,836,148 A | 11/1998 | Fukao | |
| D403,951 S * | 1/1999 | Lin | D8/356 |
| D404,101 S * | 1/1999 | Daoust | D13/155 |
| 5,877,451 A | 3/1999 | Zimmerman | |
| 5,902,961 A | 5/1999 | Viklund et al. | |
| 6,012,683 A * | 1/2000 | Howell | 174/101 X |

OTHER PUBLICATIONS www.globetray.com—Globetray Cable Tray, G.S. Metals Corp., Pickneyville, IL., Jan. 1997.

www.siemon.com/products, Multi Access Horizontal Cable Managers, The Siemon Company, Aug. 7, 1997.

www.usacitylink.com/afshome/cable, Baron Desmond, Jun. 1, 1997.

* cited by examiner

METHOD FOR MANAGING CABLES

This patent application is related to U.S. Pat. No. 6,012,683, entitled "Apparatus for Managing Cables," granted on Jan. 11, 2000.

BACKGROUND OF THE INVENTION

1. Field of the Invention

The invention relates in general to the field of cable and conduit management and, more particularly, to the organization and distribution of computer cables or other similar items.

2. Description of Related Art

Computer systems, for example, personal computers, servers, etc., may be coupled to peripheral and other devices for communicating information such as data, commands, addresses, etc. through a multitude of cables. Oftentimes these cables lay about in a haphazard or dangerous fashion. Cables strewn about a room in disarray offer ample opportunities for tripping over, for damaging the equipment to which they are connected, or for harming other equipment in close proximity. Moreover, cables laying in disarray may make it more difficult and time consuming to find a particular cable or circuit for equipment maintenance periods or during system downtimes. To avoid these problems, most of the current solutions to cable management and organization employ rings or trays of rectangular cross-section that hold the cables in place. These designs work well in some situations, but in some cases they are less than adequate, such as when it is desirable to substantially hide the cables or when space is limited.

Many times cables in offices are simply dropped down corners of walls and "zip-tied" together. A rectangular cross-section tray design may not fit snugly into an area (e.g., a corner) where cables will run, or may require too much space down the length of one side of an area to be sufficiently usable.

Another use of rectangular cable trays is to hide cables between areas where network drop boxes provide RJ-45 or other types of ports to plug in network cables. With rectangular boxes, the ports are either on the side of the tray where it is sometimes difficult to identify port numbers, or on top of the tray where it is easier for garbage to fall into the ports.

Thus, there exists a need for a cable management system which will avoid or reduce these problems, fit well into a confined space, be unobtrusive, and also provide for easy positioning of cables into and out from the system at particular required locations.

SUMMARY OF THE INVENTION

The invention, in one embodiment, is a method for using a device capable of carrying a cable, the device having a cover with a port. The method includes: (1) arranging the cable in the tray; (2) determining that the port is to be used to connect the cable; and (3) connecting the cable to the port.

BRIEF DESCRIPTION OF THE DRAWINGS

Other objects and advantages of the invention will become apparent upon reading the following detailed description and upon reference to the drawings in which.

Figure 1:
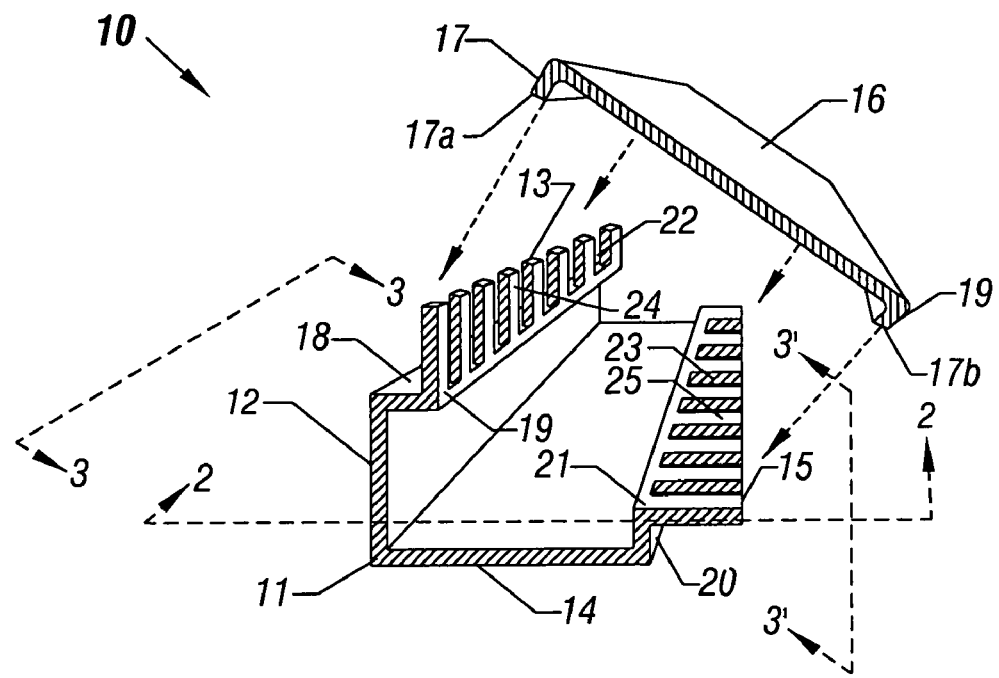
FIG. 1 is a perspective view representation of a device in accordance with a first embodiment of the invention.

While the invention is susceptible to various modifications and alternative forms, specific embodiments thereof have been shown by way of example in the drawings and are herein described in detail. It should be understood, however, that the description of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

A First Embodiment of the Invention

Figure 2:
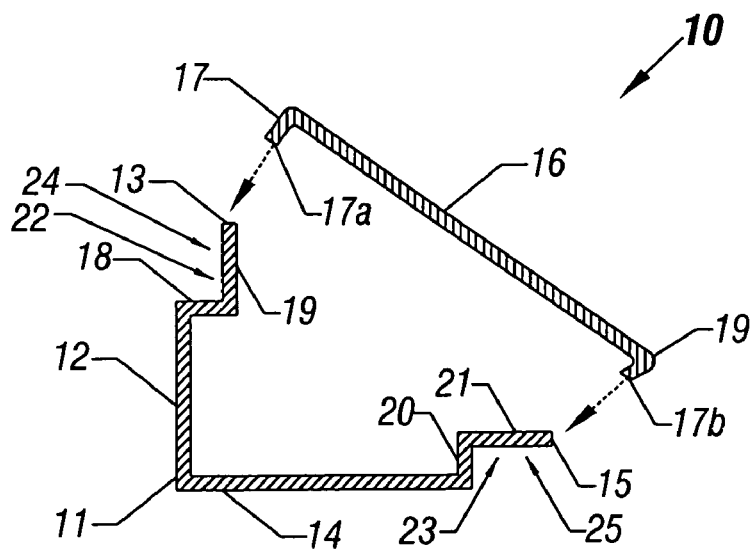
FIG. 2 is an end view of the embodiment in FIG. 1 along line 2—2 therein.

FIG. 1 shows a perspective representation view and FIG. 2 shows an end view along line 2—2 in FIG. 1 of a cable management device 10 in accordance with a first embodiment of the invention. The cable management device 10 has a somewhat triangular cross-section. The cable management device 10 includes a tray portion 11 having a rear surface or segment 12 angularly disposed relative to a bottom surface or segment 14 which, in this particular embodiment, are continuous with each other at approximately a right angle. Angles other than a right angle may be employed in alternative embodiments.

The cable management system 10 also includes a removable cover 16 which may be affixed at snapable or bendable edges 17a and 17b to both upper 13 and lateral 15 edges of the tray 11 which are located distally from the surfaces 12 and 14, respectfully. The edges 17a and 17b of the cover 16 are curved and snap or fit over a portion of the upper 13 and lower 15 ends of the tray 11 over the full length of the elongated tray 111 in the embodiment illustrated. In alternative embodiments, the cover 16 need not cover the full length of the tray 11 provided that the uncovered portion is relatively insubstantial relative to the covered portion.

Figure 3:
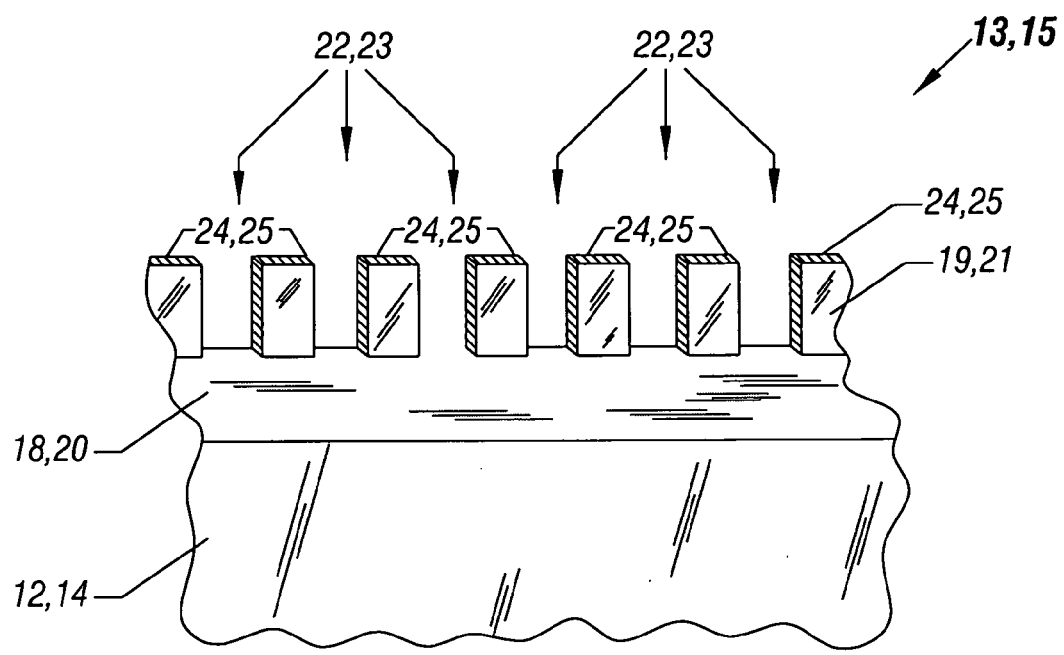
FIG. 3 is a sectional exterior view representation of portions of the device in FIG. 1 along line 3—3 or line 3'—3' in FIG. 1 in accordance with an embodiment of the invention.

Referring also to FIG. 3, which shows a sectional exterior view of either the rear surface 12 or the bottom surface 14, surface 12 is continuous with section 18 and section 18 is continuous with section 19. Likewise, surface 14 is continuous with section 20 and section 20 is continuous with section 21. Sections 18 and 19 are angularly disposed with respect to each other at approximately a right angle in this particular embodiment. Sections 20 and 21 are similarly angularly disposed with respect to each other. Sections 18 and 20 are also angularly disposed with surfaces 12 and 14, respectively, forming approximately a right angle in this particular embodiment.

As shown in FIGS. 1–3, the notches (or openings) 22 and 23 are defined between tabs (or teeth) 24 and 25, which are continuous with and form part of the notched sections 19 and 21, respectively. The notches 22, 23 and the tabs 24, 25 may be of sufficient size in the sections 19 and 21 to allow one or more cables to be routed into or out of the tray 11 through the notches 22 and 23 in an organized fashion as will be described below. Moreover, the tabs 24 and 25 of the sections 19 and 21 are of sufficient strength to support cables 26 when they are passed through the notches 22 and 23.

Figure 4:
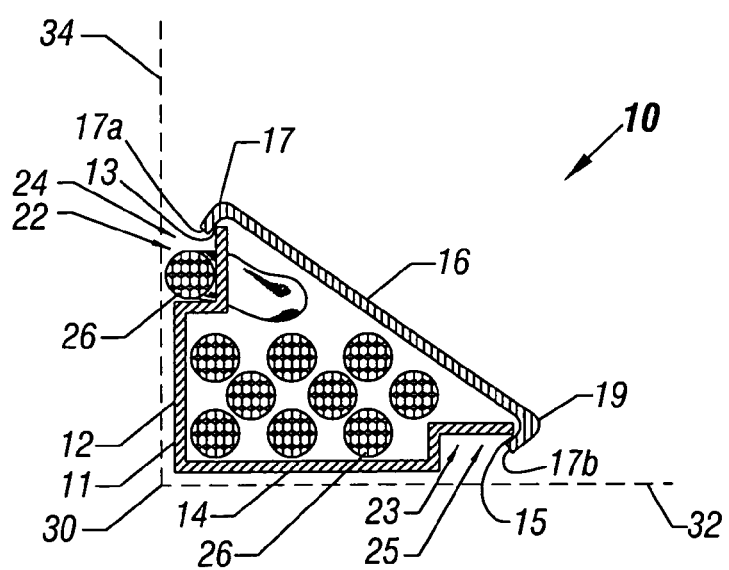
FIG. 4 is another end view illustrating a cable exiting the device in accordance with the embodiment of FIG. 1.

Referring now to FIG. 4, cables 26, which may be a plurality of cables, are arranged or distributed along the length of the tray 11, and the removable cover 16 is shown in its closed position on the tray 11 over the ends 13 and 15. The cover 16, when attached to the tray 11, will hide the cables 26 except where the cables 26 exit or enter through the notches 22 or 23 (not directly shown in FIG. 4). In certain embodiments, only one set, or neither set, of notches 22 or 23 is included in the device 10 (i.e., one section, either 19 or 21 may have no openings and the other section does) as set forth below.

The cable management device 10 may be made of plastic, for example, electrically insulating plastic. The combined height of the surface 12 and the section 19, and the combined width of the surface 14 and the section 21, may each be approximately two to three inches, although it is possible that other dimensions could be used. Moreover, the length of the tray 11 may be from approximately a few inches to approximately several feet long. As will be appreciated by those in the art having the benefit of this disclosure, the actual dimensions of the device 10 will depend on the particular embodiment being implemented. Further, although the surfaces 12 and 14 are continuous by virtue of their construction, they may be separate pieces fixedly joined by any suitable technique. The surfaces 12 and 14 are continuous by their integral construction whether they be of one piece or two. Moreover, the edges 17a or 17b of the cover 16 may instead be affixed to either one of the ends 13 or 15 of the sections 19 and 21, respectively, by a suitable hinged mechanism while the unhinged other edge may be snapped over the end 13 or 15 not having the hinged mechanism affixed.

Referring to FIG. 4, the device 10 may be positioned in a corner 30 between a floor 32 and a wall 34 of a room (not shown). The ideal angle between the floor 32 and the wall 34 will typically be square or 90 degrees. Hence, the angle between the surfaces 12 and 14 will generally be preferred to also be square. However, the angle between the floor 32 and the wall 34 will seldom be ideal, and the angle between the surfaces 12 and 14 need not exactly conform to the angle between the floor 32 and the wall 34. The angle between the surfaces 12 and 14 therefore need only substantially approximate the angle between the floor 32 and the wall 34.

Figure 5:
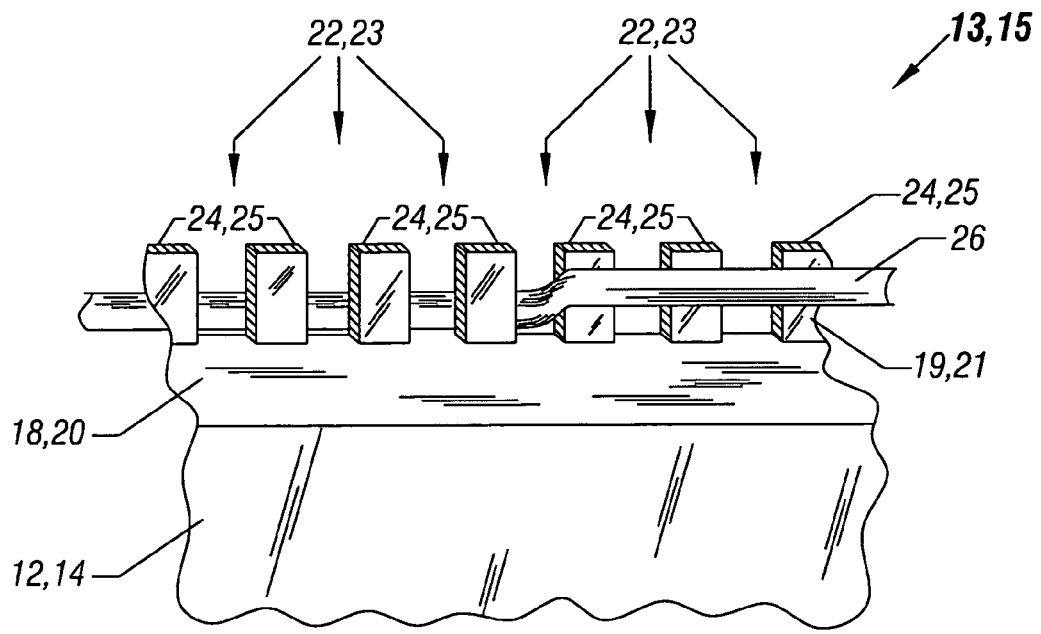
FIG. 5 is another sectional exterior view representation similar to FIG. 3 with the cable exiting the device as in FIG. 4.

The cables 26 within the tray 11 of FIG. 4 may be, for example, a bundle of ten to twenty network cables (e.g., CAT-5 networking cables) or could be smaller cables, such as computer monitor, keyboard, or mouse cables, optical fiber, etc. FIG. 4 also shows one of the cables 26 exiting through one of the notches 22 in the section 19. FIG. 5 shows a sectional exterior view similar to FIG. 3 with one of the cables 26 exiting through one of the notches 22 or 23 in the sections 19 or 21, respectively. The openings 22 and 23 in the sections 19 and 21 of the cable tray 11 allow any of the cables 26 to be routed in and out of the tray 11. More than one of the cables 26 could come out of any one of the notches 22 or 23, depending on the size of the notches 22 or 23, the size of the cables 26, the requirements set by or for a particular implementation, or according to the wishes of a user.

In use, the tray 11 could easily fit horizontally along the length of the corner 30 formed between the floor 32 and the wall 34 of the room or vertically along the length of the corner between two walls, or between a ceiling and the wall, of the room. For example, the rear surface 12 could be mounted to the wall 34 and the fixed bottom surface 14 could be mounted to the floor 32 of the room with screws (not shown) in the surfaces 12 and 14. Pre-tapped screw holes could be provided or screw hole locations could be indicated in the surfaces 12 and 14 (not shown).

The device 10 could be available in various lengths to fit a given wall length or height in a room, or be connected in lengths with triangular junction boxes (not shown) in between pairs of lengths. The device 10 could be designed to allow a clean junction at room corners, for example, with corner junction boxes (not shown) for coupling the cables 26 to another device 10, another cable 26 termination point, or for the cable 26 to be routed outside the device 10 for coupling elsewhere. Moreover, in certain embodiments, the device 10 could be designed with an angle, for example, a right angle, in the tray 11 and cover 16 such that the angle would fit in the corner of the room and the device 10 would itself function as a junction box. In this case, the angle would be about a vertical axis parallel to the surface 12.

A Second Embodiment of the Invention

Figure 6:
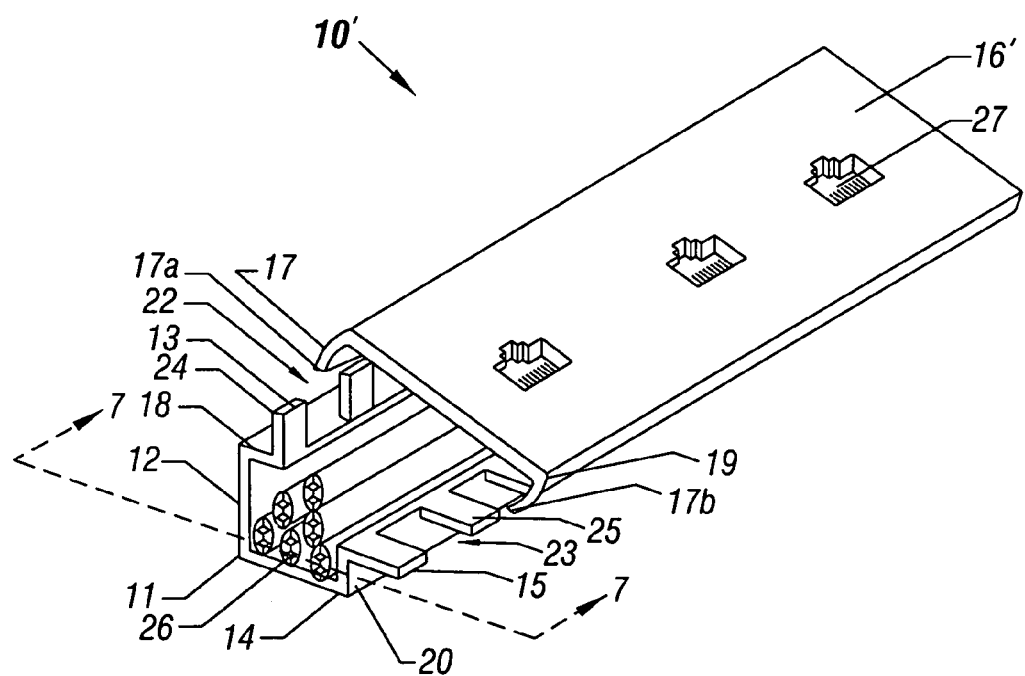
FIG. 6 is a perspective view of a device similar to the device in FIG. 1 in accordance with a second embodiment of the invention.

In accordance with a second embodiment of the invention, shown in a perspective view in FIG. 6, a device 10' includes a tray 11' and a cover 16' having ports or connectors 27 (e.g., network ports). The tray 11' may be similar to tray 11 in the device 10 with the notches 21 and 22 in sections 19 and 21, or one or both sets of the notches 19 and 21 may be omitted (not shown). The device 10' is otherwise similar to the device 10. The ports 27 in the cover 16' may be, for example, RJ-45 network ports, RJ-11 ports, GPIB ports, serial or parallel ports, DB-9 or DB-25 connectors, or 34 or 50 pin, or other connectors for connecting network cables external to the device 10' to the cables 26 (which may be network cables) which are carried within the device 10', as shown in FIG. 7 in an end view (with the cover 16' closed).

Figure 7:
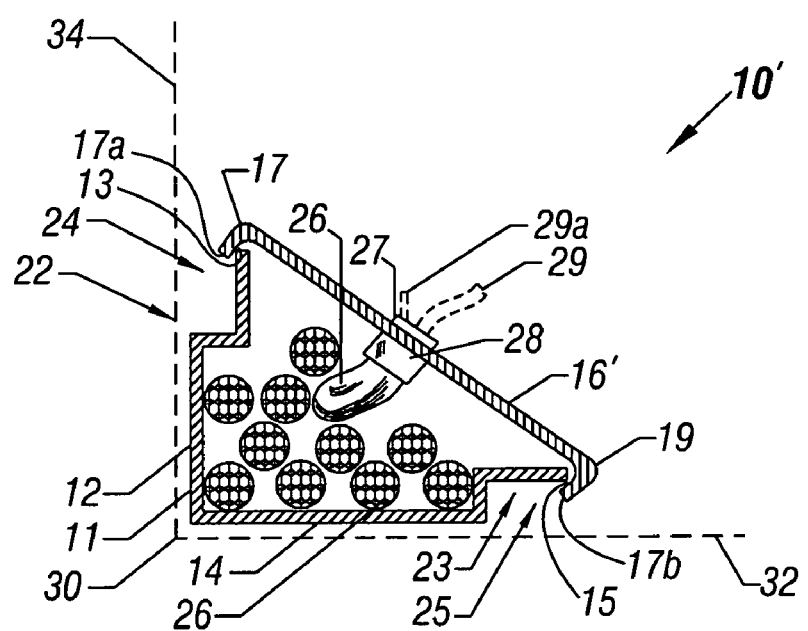
FIG. 7 is an end view representation similar to the view along line 7—7 in FIG. 6 in accordance with the second embodiment of the invention.

In FIG. 7, one of the cables 26 is shown coupled by a connector 28 to the port 27 and an external cable 29 is also coupled by a connector 29a to the port 27 so that signals may be passed between the cables 26 and 29. Such an implementation, as shown in FIG. 7, facilitates cable connection with the cables 26 to completely contain them within the device 10'.

One use of the triangular cable devices 10 or 10' could be to hide network or other cables 26 that are run along the corners between wall and floor or ceiling, or to hide the cables 26 running up and down corners between walls. Another use of the devices 10 or 10' could be to mount it under the working surface of a desk. This would allow the user of a workstation or computer to route monitor, keyboard, mouse, network, or other cables 26 through the trays 11 or 11' and drop them to the workstation or computer, or to a network port. Moreover, the devices 10 or 10' could help clear up a tangle of cables beneath the desk. The devices 10 or 10' could also be used anywhere where a port-like device would need to be routed on a semi-permanent or permanent basis.

Figure 8:
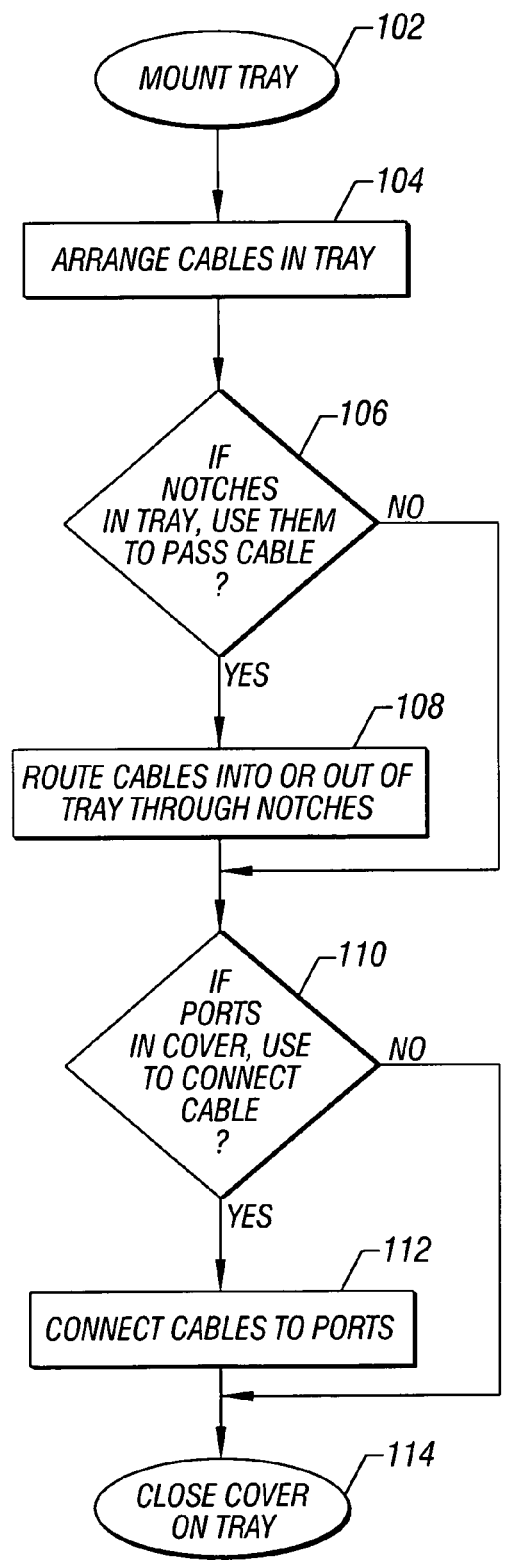
FIG. 8 is a flow chart representation of a method in accordance with an embodiment of the invention.

Referring to FIG. 8, a flowchart representation of a method in accordance with an embodiment of the invention is shown. In use, the triangular cable trays 11 or 11' may be mounted as in block 102 against a wall, floor, desk, other piece of furniture, etc. (e.g., with screws). The cables 26 may then be placed and arranged as in block 104 into the trays 11 or 11', as needed, for a particular implementation. If the openings 22 or 23 in the sections 19 or 21 of the cable trays 11 or 11', respectively, are to be used as in block 106 to pass cables, the cables 26 may be routed as in block 108 into or out of the trays 11 or 11', as needed, for further connection. Various sizes of the notches 22 or 23 could be available in different trays 11 or 11' and could be chosen for a particular implementation based on what type of cable (or cord or hose) 26 is to be routed into or out of the trays 11 or 11'. Once the cables 26 have been routed into or out of the trays 11 or 11', or if they are only to be placed and arranged in the trays 11 or 11' (i.e. they are not to be routed), the covers 16 or 16' may be closed as in block 114 on the trays 11 or 11'.

Alternatively, if the ports 27 of the device 10' are to be used in the implementation (with or without the notches 22 or 23 being present) to connect, as in block 110, the cable 26 (or more than one cable 26), the cable 26 may be connected, as in block 112, to the port 27 (e.g., using the appropriate cable 26 connector 28 which is complementary to the port 27). Hence, the cable 26 may be connected to or through the port 27 and to the cable 29 external to the cover 16' for further connection to equipment external to the device 10', or for termination.

The type of port 27 could vary depending on what type of cable 26 (or cord or hose), or connection is necessary, sufficient, or preferable for the particular implementation. Moreover, some ports 26 may be interchangeable, and if the device 10' includes the notches 22 or 23, these may also be used, in similarity to implementations using device 10 as described above. Once all cables 26 are positioned, routed, or connected, or if the ports 27 (device 10') are not used to connect the cables 26, or if the ports 27 are not included (e.g., device 10), the covers 16 or 16' may be positioned as in block 112, as discussed, on the trays 11 or 11' to close the devices 10 or 10'. This may be accomplished by snapping or bending the edges 17a and 17b of the covers 16 or 16' over the ends 13 and 15, respectively, of the sections 19 and 21 as discussed.

In certain embodiments, the somewhat triangular cross-section of, for example, the device 10' may allow port numbers, which may be indicated near the ports 27, to be easily read for identification by a standing person. This is possible because the cover 16', when the tray 11' is closed, is aligned at an angle (e.g., a 45 degree angle to vertical). The somewhat triangular cross-section of the device 10' may also make it less likely that items (e.g., garbage, dirt, etc.) would fall into the ports 27. A small shield (not shown) could be included which prevents these items from falling into the ports.

REMARKS

The particular embodiments disclosed above are illustrative only, as the invention may be modified and practiced in different but equivalent manners apparent to those skilled in the art having the benefit of the teachings herein. For instance, the invention may be used to manage many forms of flexible, nonflexible, or partially flexible elongated transmission media such as coaxial cable, twisted wire pairs, optical fibers, etc., or combinations of all the above. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
   mounting a tray, the tray including a longitudinal groove that has a substantially uniform cross-section and is defined between first and second longitudinally-extending edges of the tray, the first edge comprising first a notch and the second edge comprising a second notch;
   placing a cable in the groove;
   selectively routing the cable through the first notch;
   selectively routing the cable through the second notch, the cable extending through the first notch in a first direction that is substantially orthogonal to a second direction along which the cable extends through the second notch; and
   placing a cover that extends between the first edge and the second edge to close the groove and conceal the cable in the groove.

2. The method of claim 1, wherein placing comprises contacting at least one of the first and second longitudinal edges with the cover.

3. The method of claim 1, wherein the notch in the first edge comprises one out of a plurality of notches in the first longitudinal edge.

4. The method of claim 3, wherein the notch in the second edge comprises one out of a plurality of notches in the second longitudinal edge.

5. The method of claim 1, wherein said plurality of notches are uniformly spaced with respect to each other along the first longitudinal edge.

6. The method of claim 1, wherein the first and second longitudinal edges impart a slope to the cover relative to the edges when the cover closes the groove.

7. A method comprising:
   forming a tray, the tray including a longitudinal groove that has a substantially uniform cross-section and is defined between first and second longitudinally-extending edges of the tray, the first edge comprising a first notch and the second edge comprising a second notch;
   adapting the tray to hold at least one cable so that the first edge includes the first notch and the second edge includes the second notch so that when the cable is routed through the first notch, the cable extends through the first notch in a first direction and when the cable is routed through the second notch, the cable extends through the second notch in a second direction substantially orthogonal to the first direction; and forming a cover to extend between the first edge and the second edge to close the groove and conceal the cable in the groove.

8. The method of claim 7, wherein the forming comprises adapting the cover to contact at least one of the first and second longitudinal edges.

9. The method of claim 7, wherein the notch in the first edge comprises one out of a plurality of notches in the first longitudinal edge.

10. The method of claim 9, wherein the notch in the second edge comprises one out of a plurality of notches in the second longitudinal edge.

11. The method of claim 9, wherein said plurality of notches are uniformly spaced with respect to each other along the first longitudinal edge.

* * * * *

UNITED STATES PATENT AND TRADEMARK OFFICE
CERTIFICATE OF CORRECTION

PATENT NO.    : 6,996,904 B1
DATED         : February 14, 2006
INVENTOR(S)   : Matthew G. Howell It is certified that error appears in the above-identified patent and that said Letters Patent is hereby corrected as shown below:

Column 6,
Line 27, "first a" should be -- a first --.

Signed and Sealed this

Twenty-fifth Day of April, 2006

JON W. DUDAS
*Director of the United States Patent and Trademark Office*